Nov. 22, 1955          P. L. HOWARD          2,724,732
PROCESS FOR MAKING ELECTRODES FOR ALKALINE BATTERIES
Filed Jan. 18, 1954
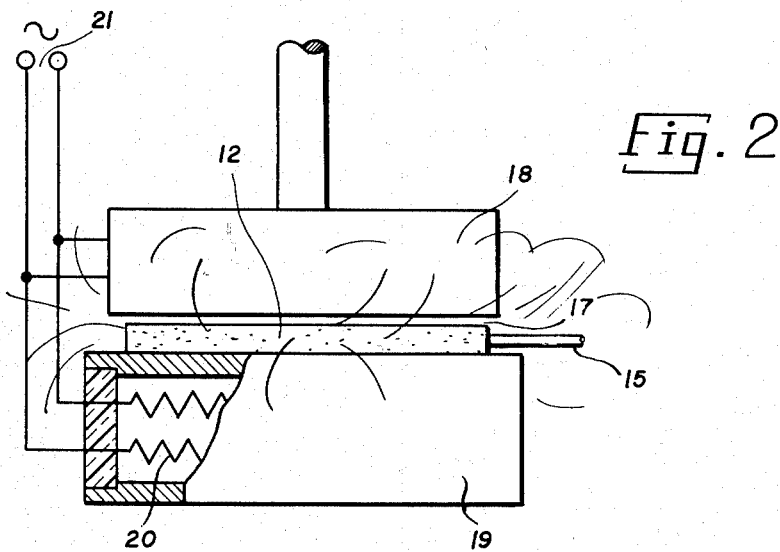
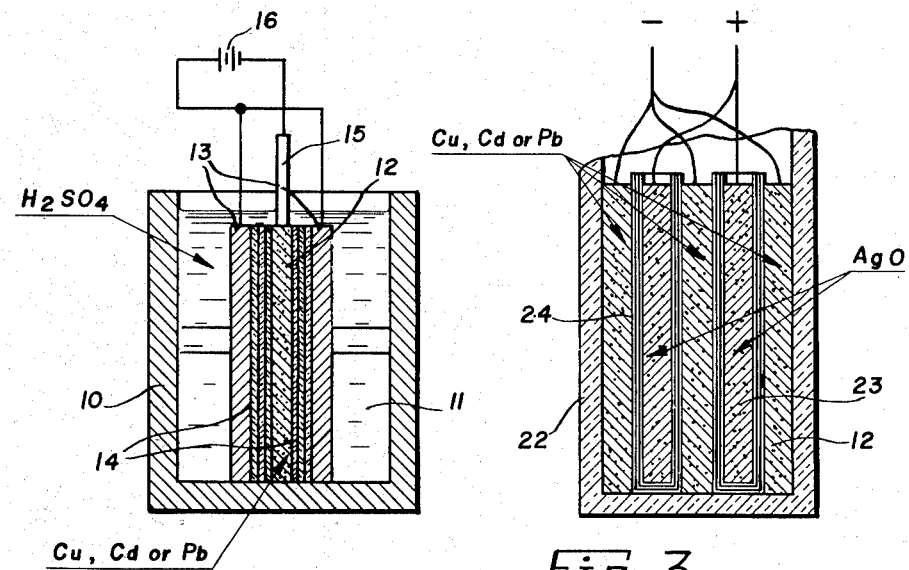
INVENTOR:
PAUL L. HOWARD
BY
AGENT

United States Patent Office 2,724,732
Patented Nov. 22, 1955

2,724,732
PROCESS FOR MAKING ELECTRODES FOR ALKALINE BATTERIES

Paul Lindsay Howard, Ridgewood, N. J., assignor to Yardney International Corp., New York, N. Y., a corporation of New York Application January 18, 1954, Serial No. 404,504

6 Claims. (Cl. 136—6)

My present invention relates to electric batteries and, more particularly, to negative electrodes for alkaline batteries (primary or secondary) and to a process for making such electrodes.

The most useful alkaline batteries have heretofore been produced from positive and negative electrodes containing silver and zinc, respectively. In such batteries the operating voltage is about 1.4 volts and is reasonably stable throughout the major part of the discharge. In some instances, however, voltages nearer to one volt (or multiples thereof) are desirable; also, in many cases a cell voltage lower than that available with silver-zinc couples can be tolerated whereas a higher degree of voltage stability is required.

The general object of my present invention is to provide an electrode, of a metal other than zinc, adapted to be used as the negative element of a couple whose positive element is a silver electrode and which satisfies either or both of the aforementioned requirements, as well as a process for making such negative electrode in an economic and expeditious manner.

In my co-pending application Ser. No. 322,047, filed November 22, 1952, I have disclosed a process for making a zinc electrode from zinc oxide by electrolytic reduction and subsequent drying in an atmosphere of live steam. I have now found that a similar process may be used in producing a negative plate of spongy lead, cadmium or copper, adapted to be coupled with a positive plate of silver dioxide to give substantially constant operating voltages of about one volt or slightly higher.

Whereas, furthermore, the process for producing zinc electrodes described in my aforesaid co-pending application involves the formation of spongy zinc from zinc oxide in an alkaline solution, I have found, in accordance with another feature of this invention, that in the case of lead, cadmium or copper, the formation of the spongy metal from one of its salts (e. g. an oxide, sulfate or carbonate thereof) may proceed more satisfactorily in acid solution, the resultant electrode body being of a more spongy structure and having about double the storage capacity of an electrode formed in alkali.

The invention will be further described with reference to the accompanying drawing in which:

Fig. 1 illustrates, somewhat diagrammatically, the process of electrolytically forming an electrode according to the present invention;

Fig. 2 illustrates the drying of the electrode of Fig. 1; and

Fig. 3 shows part of an electric battery incorporating negative electrodes produced by the process of Figs. 1 and 2.

Referring first to Fig. 1, there is shown a vessel 10 containing a sulfuric-acid solution 11 having a specific gravity of approximately 1.100. A plate 12 comprising a compound of copper, cadmium or lead is sandwiched between two electrodes 13 of inert metal, e. g. stainless steel, and is separated therefrom by electrolyte-resistant, permeable spacers 14, e. g. layers of nylon or Dynel mesh. A lead 15, projecting from plate 12, is connected to the negative terminal of a battery 16 whose positive terminal is connected to the two electrode plates 13. The lead 15 may form an integral projection of a suitable conductive support, e. g. a grid, having interstices packed with the active electrode material in a manner known per se.

The treatment in the electrolytic bath of Fig. 1 converts the metal salt of plate 12, e. g. lead oxide, cadmium sulfate or copper carbonate, into spongy lead, cadmium or copper, respectively. After the electrode 12 has thus been formed, it is washed in water until free from acid and is then inserted into a narrow vapor chamber 17 defined by two heated plates 18 and 19. The plates 18, 19 may be heated by resistors 20, as shown for the lower plate 19, from a source of current 21.

It will be appreciated that, in the manner disclosed in my above-mentioned co-pending application, insertion of the washed plate 12 into chamber 17 for a brief period (usually of the order of seconds) will convert the adhering water into steam which totally envelopes the electrode and keeps off the oxygen of the atmosphere. The dried plate, when withdrawn from the chamber, is ready for use in a battery as illustrated schematically in Fig. 3.

The battery of Fig. 3 comprises a casing 22 in which negative electrodes 12, produced by the process of Figs. 1 and 2, alternate with positive electrodes 23 whose active material consists essentially of silver dioxide AgO. Permeable or semi-permeable separators 24, e. g. layers of paper and/or cellophane, are inserted between adjacent electrodes of opposite polarities and are permeated by an alkaline electrolyte (not shown). The battery may now be discharged to deliver useful current, whereby the negative plates 12 will be oxidized and the positive plates 23 will be reduced to metallic silver. It may be mentioned that the active materials herein disclosed do not exhibit the same marked tendency as zinc to penetrate through the separator on charge, whereby a battery incorporating negative electrodes according to the invention may be recharged a relatively large number of times even with inferior types of separators.

I claim:

1. A process for making a battery electrode, comprising the steps of forming an electrode body from a salt of a metal selected from the group which consists of cadmium, copper and lead, cathodically reducing said salt to spongy metal, washing said electrode body with water, and drying said electrode body in a substantially oxygen-free atmosphere.

2. A process for making a battery electrode, comprising the steps of forming an electrode body from a salt of a metal selected from the group which consists of cadmium, copper and lead, cathodically reducing said salt to spongy metal, washing said electrode body with water, and drying said electrode body in an atmosphere of live steam.

3. A process for making a battery electrode, comprising the steps of forming an electrode body from a salt of a metal selected from the group which consists of cadmium, copper and lead, cathodically reducing said salt to spongy metal, washing said electrode body with water, and drying said electrode body by substantially instantaneous vaporization of the adhering water in a space narrow enough to have the resulting vapor envelop said electrode body, thereby excluding the atmospheric air.

4. A process for making a battery electrode, comprising the steps of forming an electrode body from a salt of a metal selected from the group which consists of cadmium, copper and lead, cathodically reducing said salt in said solution to spongy metal, washing said electrode body with water, and drying said electrode body in substantially oxygen-free atmosphere.

5. A process for making a battery electrode, comprising the steps of forming an electrode body from a salt of a metal selected from the group which consists of cadmium, copper and lead, cathodically reducing said salt in acid solution to spongy metal, washing said electrode body with water, and drying said electrode body in an atmosphere of live steam.

6. A process for making a battery electrode, comprising the steps of forming an electrode body from a salt of a metal selected from the group which consists of cadmium, copper and lead, cathodically reducing said salt in acid solution to spongy metal, washing said electrode body with water, and drying said electrode body by substantially instantaneous vaporization of the adhering water in a space narrow enough to have the resulting vapor envelop said electrode body, thereby excluding the atmospheric air.

References Cited in the file of this patent

UNITED STATES PATENTS

| | | |
|---|---|---|
| 942,279 | Perry | Dec. 7, 1909 |
| 1,144,311 | Redding | June 22, 1915 |
| 1,450,533 | Williams | Apr. 3, 1923 |
| 2,611,792 | Andre | Sept. 23, 1952 |
| 2,634,303 | Moulton | Apr. 7, 1953 |